United States Patent
Phillipps et al.

[11] Patent Number: 5,360,131
[45] Date of Patent: Nov. 1, 1994

[54] COVER HEIGHT ADJUSTER

[75] Inventors: Guy M. Phillipps; Wayne A. Harris, both of Plympton, Australia

[73] Assignee: Philmac Pty. Ltd., Australia

[21] Appl. No.: 24,526

[22] Filed: Mar. 1, 1993

Related U.S. Application Data

[63] Continuation-in-part of Ser. No. 722,962, Jun. 28, 1991.

[30] Foreign Application Priority Data

Jun. 29, 1990 [AU] Australia ............... PK0921
Mar. 2, 1992 [AU] Australia ............... PL1142

[51] Int. Cl.⁵ .................................. B65D 88/76
[52] U.S. Cl. ........................... 220/8; 220/484; 220/4.03; 220/3.7; 404/26
[58] Field of Search .......... 404/26; 52/19, 20, 21; 137/364, 370; 174/48, 50, 49, 66, 37; 248/906, 911; 220/3.2, 3.3, 3.7, 3.8, 484, 8, 4.03, 698, 700

[56] References Cited

U.S. PATENT DOCUMENTS

| 599,441 | 2/1898 | Dorr | 404/26 |
| 4,874,105 | 10/1989 | Tetreault | 220/8 |
| 4,906,128 | 3/1990 | Trudel | 404/26 |

FOREIGN PATENT DOCUMENTS

| 39843 | 9/1973 | Australia | 404/26 |
| 2805869 | 8/1979 | Germany | 404/26 |
| 82511 | 3/1956 | Netherlands | 220/3.7 |
| 7404558 | 10/1975 | Netherlands | 404/26 |

*Primary Examiner*—S. Castellano
*Attorney, Agent, or Firm*—Brown, Martin, Haller & McClain

[57] ABSTRACT

A cover height adjuster which can be used for a boundary box, a manhole cover, etc. in a paved location having two rings with interengaging sloping castellated end surfaces extending around the peripheries of at least three sectors of the rings and can vary the height of the upper ring upon its rotation over the lower ring. The upper surface of the upper ring may have a slope which engages a sloping surface of a cover assembly, so that relative rotation can also vary the slope of the cover.

1 Claim, 2 Drawing Sheets

COVER HEIGHT ADJUSTER

CROSS-REFERENCES TO RELATED APPLICATIONS

This is a Continuation-In-Part of co-pending U.S. patent application No. 07/722,962 filed Jun. 28, 1991.

FIELD OF THE INVENTION

This invention relates to a cover height adjuster which can be used for example in conjunction with a meter box installation, a boundary box, a valve cover, a manhole cover, or a drainage grate.

BACKGROUND OF THE INVENTION

In the above-mentioned installation and many others, there is frequently a need for access to be provided for subterranean apparatus for example, a water meter or valve, or a manhole cover in a road surface. It is a relatively simple matter to install a cover for example to be in a roadway oriented to the same angle as the road surface in which it is located and further to be substantially coplanar with the surrounding road surface. However, as the road wears and is resurfaced, either or both the surface level and camber can change and one of the objects of this invention is to provide means whereby at least the height can be varied so that a single cover assembly can be utilized for a range of situations which are encountered in practice.

Another problem sometimes encountered is variation of position, height or camber due to vibration and load imparted by traffic to a cover in a road surface, particularly if the cover is ill-fitting, a situation which frequency exists. Vibration can cause both settlement of the ground and rotation of a cover, both of which, if surmounting a tapered spacer ring, will increase error of location with respect to the surrounding road surface. Another object of this invention is to provide means which will both provide not only ready height adjustment means but will also inhibit rotation.

SUMMARY OF THE INVENTION

A cover height adjuster assembly comprises two rings (or sleeves) each having interengaging end surfaces which are spaced axially from one another (for example, castellated surfaces) and extend around the peripheries of sectors of each of the rings, and being engageable in such a way that one ring can be positioned on another in any one of a plurality of rotational positions, and by rotation can raise or lower its upper surface with respect to the height of the lower ring. The upper surface of the upper ring can slope, and engage a sloping surface on the cover, so that the slope of the cover can be varied by rotation with respect to the other ring.

More specifically, a cover height adjuster assembly in this invention consists of two rings having end surfaces spaced axially from one another and extending around the peripheries of sectors of each of the rings, some at least of said end surfaces of each ring abutting complementary said end surfaces of the other ring when the rings are coaxial and, upon relative rotation of the rings, varying the distance between the other ends of the rings.

BRIEF DESCRIPTION OF THE DRAWINGS

An embodiment of the invention is described hereunder in some detail with reference to, and is illustrated in, the accompanying drawings, in which.

DESCRIPTION OF THE PREFERRED EMBODIMENT

Figure 1:
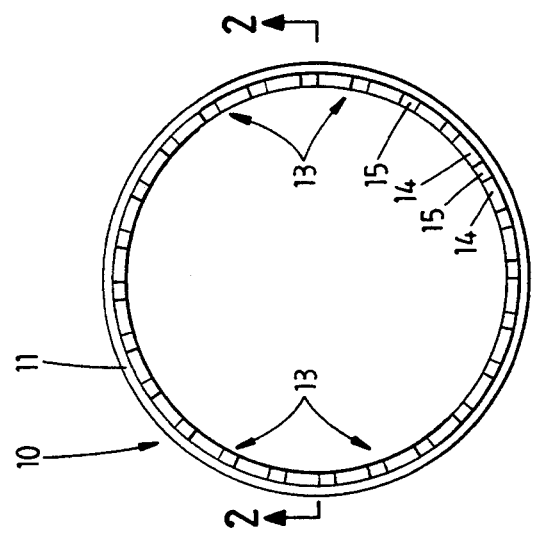
FIG. 1 is a plan view of a lower ring having four sectors each with a castellated periphery.
Figure 2:
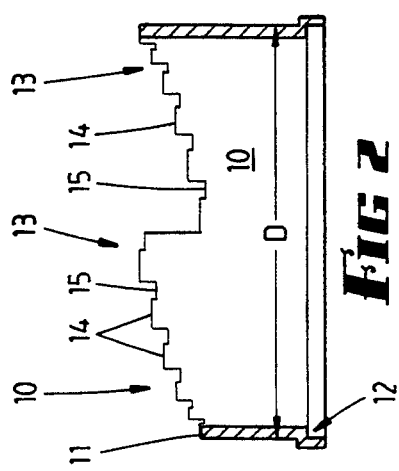
FIG. 2 is a central section taken on line 2—2 of FIG. 1.
Figure 7:
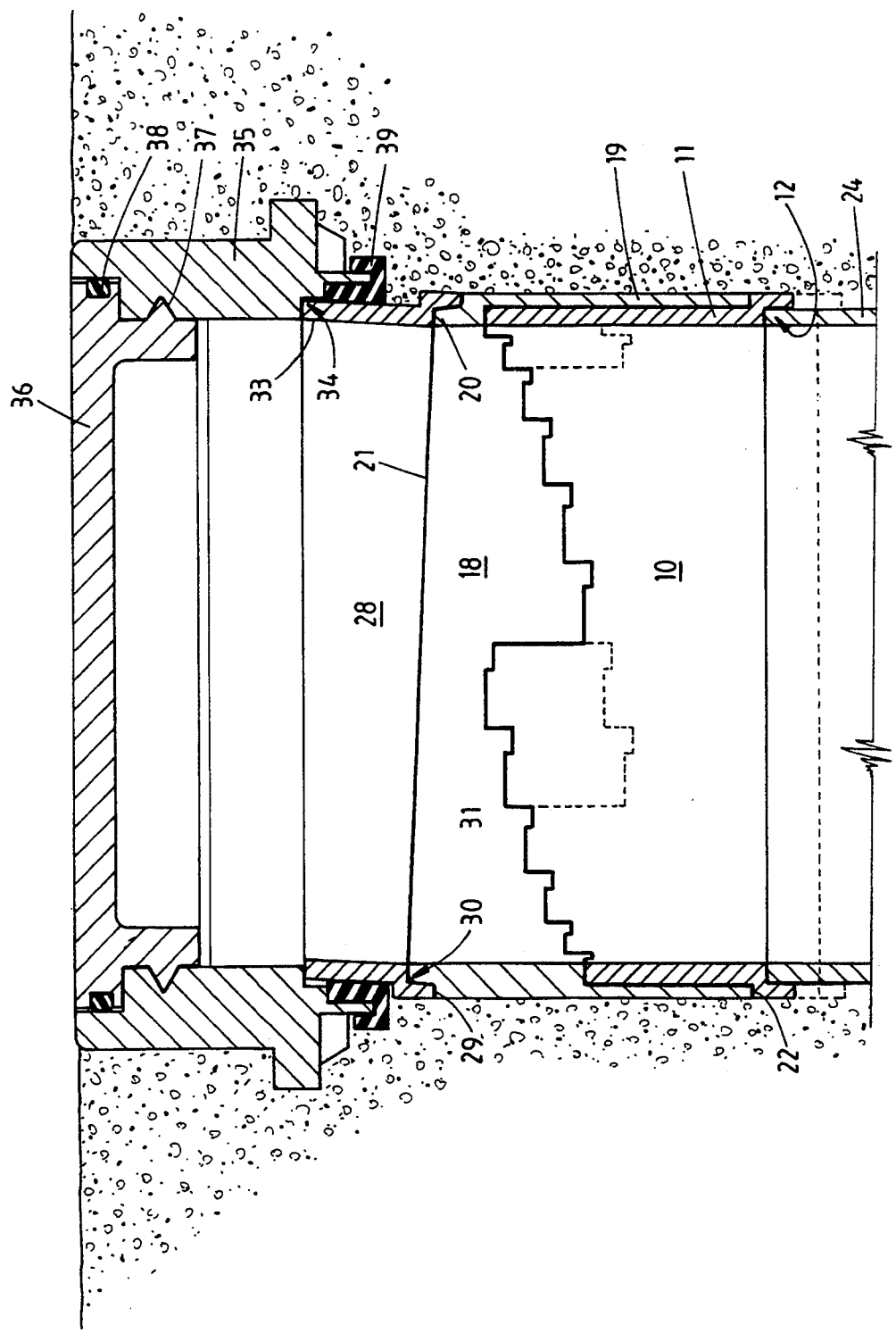
FIG. 7 shows an assembly with a cover in place.

FIGS. 1 and 2 show a lower ring 10 which has an outer cylindrical portion 11, the cylindrical portion 11 terminating at its lower end in a register recess 12 by which the ring can be supported from the open mouth of an upstanding tube in the ground (as shown in FIG. 7).

The upper edge of the ring 10 comprises four sectors 13 each of which occupies 90°, and the periphery of each sector 13 is divided into a plurality of upwardly facing steps 14 separated by walls defining downwardly extending notches 15, and each step and notch is either higher of lower than its next adjacent step and notch, and forms a castellated configuration. For stability there must be at least three sectors 13.

Figure 3:
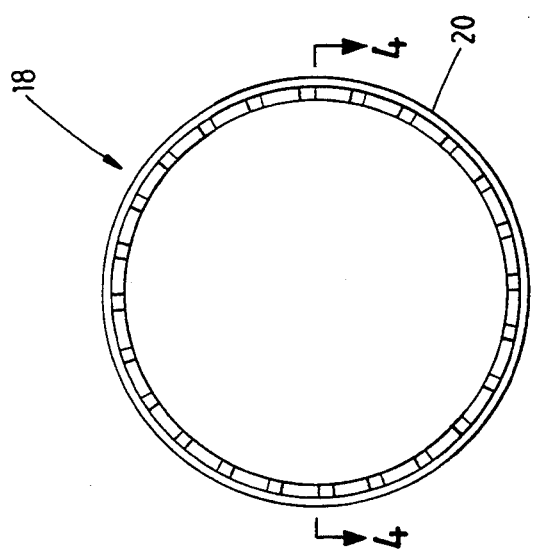
FIG. 3 is an underside view, but otherwise similar to that of FIG. 1, and showing the configuration of an upper ring, which is complementary to the lower ring.
Figure 4:
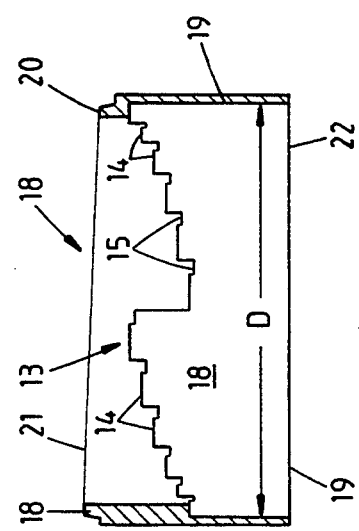
FIG. 4 is a central section taken on line 4—4 of FIG. 3.
Figure 5:
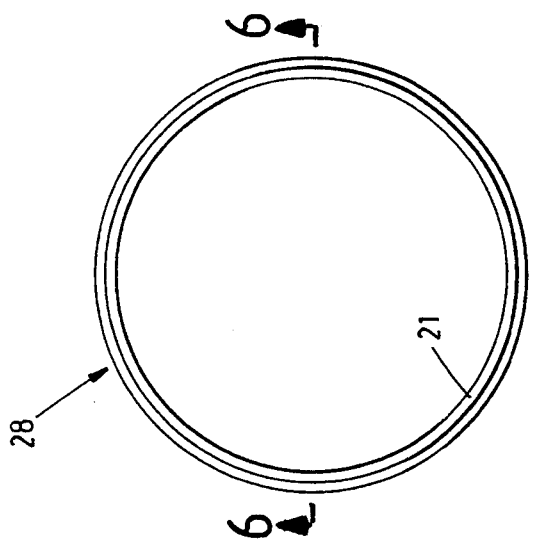
FIG. 5 is a plan view of a tapered cover support ring which is useful for varying the camber of a lid.

FIGS. 3 and 4 correspond to FIGS. 1 and 2, and illustrate a complementary upper ring 18. When cooperating with a lower ring 10, the complementary shaped upper ring 18 can be elevated by simply lifting it, rotating it, and lowering it so that its upwardly extending recesses 14a and downwardly extending projections 15a are engaged by another set of upwardly extending steps 14 and the walls of notches 15, which inhibit further relative rotation and effect a height change. Rotation could otherwise occur due to the steep helix angle of the castellated sections 13. The height adjustment method made available by this invention eliminates the need to dig out a meter box, for example, and reposition it, as frequency occurs in current practice upon soil settlement.

Since when the upwardly extending recesses 14a of complementary upper ring 18 are engaged by the upwardly projecting steps 14 of the lower ring 10, the downwardly extending notches 15 of ring 10 are engaged by downwardly extending projections 15a of upper ring 18, further rotation is inhibited without again lifting ring 18. Further, there is no need for a sleeve to surround the castellated sectors, although in most instances this is preferred. As, shown in FIGS. 2 and 4, the dimension D can be the same so that the skirt 19 of ring 18 can surround the castellated surfaces of lower ring 10 as in FIG. 7, and ensure that concentricity is maintained even under adverse conditions.

The upper ring 18 terminates at its upper end in a spigot 20, but the upper surface 21 of the spigot 20 is not parallel to the lower surface 22 of the ring 18, but as shown in FIG. 4, slopes by an amount sufficient to enable a cover lid to approximately match road camber, and when upper ring 18 overlies complementary lower ring 10, itself on an upstanding pipe 24 (FIG. 7), the rings and pipe are all subterranean.

Figure 6:
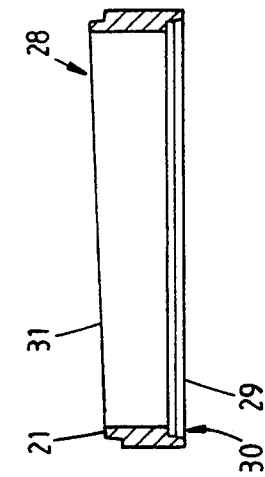
FIG. 6 is a central section through FIG. 5.

However, usually there is need for both packing and camber adjustment beyond the limits of the castellated and sloping steps, and FIGS. 6 and 7 show a plain cover support ring 28 having a lower edge 29 which defines the bottom extremity of a register recess 30 to receive spigot 20 of upper ring 18. The lower edge 29 of cover support ring 28 slopes at an angle similar to the upper edge 21 of the upper ring 18. The upper end 31 of ring 28 terminates in a spigot 33 identical to the spigot 20, and therefore functions in an identical manner. As shown in the FIG. 7 configuration, spigot 33 engages in a register recess 34 in the lower end of a manhole cover surround 35 which carries a cover 36 screwed at 37. Seals 38 and 39 inhibit moisture ingress. If cover surround 35 is square, it does not tend to rotate, but if the cover surround 35 is circular, vibration imparted, rotation may be limited by use of projections and matching recesses between the engaging surfaces of upper ring 18, and cover support ring 28 (not shown).

The dotted lines on FIG. 7 illustrate the manner in which the distance between rings 10 and 18 may be increased upon relatively rotation.

Although the invention will be seen to be one of considerable simplicity it nevertheless fulfills a long felt need in the art of manhole covers, water meter covers, grates, or valve covers and other areas where there is a need for human interference with the subterranean equipment buried beneath a road or path surface. The invention achieves control of both height and slope of a manhole cover and cover surround.

We claim:

1. A cover height adjuster assembly comprising a lower ring, an upper ring vertically above the lower ring and having a skirt surrounding the lower ring;

the lower ring having an upwardly castellated upper surface and the upper ring having a downwardly castellated lower surface within said skirt complementary to said upwardly castellated surface and being supported thereby, one of said castellated surfaces comprising horizontal steps separated by notches defined by notch surfaces and the other of said castellated surfaces comprising horizontal steps separated by projections at last some of which are positionable in respective said notches and inhibited by the notch surfaces thereof against relative rotation of the rings when so positioned, said castellated upper and lower surfaces generally sloping around at least three sectors of said lower and upper rings, respectively, such that the height of said upper ring with respect to said lower ring varies with different relative rotational positions of said upper and lower rings, said upper ring having a sloping upper surface; and a cover support ring surmounting said upper ring and having an upper surface and a lower surface which slopes with respect to said cover support ring upper surface and which abuts said sloping upper ring upper surface, such that said cover support ring upper surface has a slope which varies with relative rotational positions of said cover support ring and upper ring.

* * * * *

UNITED STATES PATENT AND TRADEMARK OFFICE
CERTIFICATE OF CORRECTION

PATENT NO. : 5,360,131
DATED : November 1, 1994
INVENTOR(S) : Guy M. Phillipps and Wayne A. Harris It is certified that error appears in the above-indentified patent and that said Letters Patent is hereby corrected as shown below:

- Column 4, claim 1, line 15, replace "last" with --least--.

Signed and Sealed this

Eighteenth Day of April, 1995

Attest:

Attesting Officer

BRUCE LEHMAN

Commissioner of Patents and Trademarks